(12) United States Patent
Alapuranen et al.

(10) Patent No.: US 9,325,484 B2
(45) Date of Patent: Apr. 26, 2016

(54) METHOD TO ENABLE RAPID SCANNING BY COGNITIVE RADIOS

(71) Applicant: XG TECHNOLOGY, INC., Sarasota, FL (US)

(72) Inventors: Pertti Alapuranen, Deltona, FL (US); Jinu Kurian, Sunrise, FL (US); Brad Rainbolt, Sunrise, FL (US); Sreekant Nair, Plantation, FL (US)

(73) Assignee: XG TECHNOLOGY, INC., Sarasota, FL (US)

( * ) Notice: Subject to any disclaimer, the term of this patent is extended or adjusted under 35 U.S.C. 154(b) by 123 days.

(21) Appl. No.: 14/070,637

(22) Filed: Nov. 4, 2013

(65) Prior Publication Data

US 2014/0126554 A1    May 8, 2014

Related U.S. Application Data

(60) Provisional application No. 61/722,464, filed on Nov. 5, 2012.

(51) Int. Cl.
*H04L 5/00*        (2006.01)
*H04L 27/00*       (2006.01)

(52) U.S. Cl.
CPC .......... *H04L 5/0092* (2013.01); *H04L 27/0006* (2013.01)

(58) Field of Classification Search
None
See application file for complete search history.

(56) References Cited

U.S. PATENT DOCUMENTS

| | | | |
|---|---|---|---|
| 8,614,969 B2 | 12/2013 | Youn et al. | |
| 8,780,879 B2 * | 7/2014 | Tomita et al. | 370/344 |
| 2009/0168713 A1 * | 7/2009 | Shao et al. | 370/329 |
| 2009/0196180 A1 * | 8/2009 | Bahl et al. | 370/235 |
| 2010/0271948 A1 * | 10/2010 | Challapali et al. | 370/235 |
| 2010/0304772 A1 | 12/2010 | Wang et al. | |

\* cited by examiner

*Primary Examiner* — Ian N Moore
*Assistant Examiner* — Brian T Le
(74) *Attorney, Agent, or Firm* — Dennis L. Cook, Esq.

(57) ABSTRACT

A cognitive radio scanning method is disclosed that enables cognitive radios to rapidly scan for neighboring channels by staggering the position of beacons across the frame relative to other channels and intelligently allocate the bandwidth across super frames such that a device has the ability to switch and scan multiple beacons both within and across multiple super frames.

1 Claim, 4 Drawing Sheets

In 10ms we can only scan 1 beacon on 1 channel.

Requires N super frames to scan for beacon on N channels

METHOD TO ENABLE RAPID SCANNING BY COGNITIVE RADIOS

CROSS-REFERENCE TO RELATED APPLICATION

The present application claims the benefit of previously filed Provisional Patent Application Ser. No. 61/722,464 filed Nov. 5, 2012.

FIELD OF THE INVENTION

This invention describes a cognitive radio transmission system, and more specifically is a method that enables cognitive radios to rapidly scan for neighboring channels.

BACKGROUND OF THE INVENTION

Wireless links between a base station and a mobile device will experience fluctuation on a regular basis due to impairments in the channel. These impairments are introduced by motion, localized interference from other transmitters (in-band and out-of-band) and also external factors like terrain, weather, buildings and lack of line of sight etc. To provide the best end-user experience, cognitive radios may need to hand-off to a different base station or access point in order to maintain the best link. In multi-channel systems, for e.g. xMax networks, a handoff may involve switching to a different channel (logical or frequency). Therefore, efficiently identifying this new channel is of paramount importance in order to maintain the best link with minimal downtime.

When the device is mobile and moving at vehicular speeds, the link to the current base station or access point deteriorates at a much more rapid pace than when stationary or at pedestrian speeds. Therefore it is even more imperative to reduce the latency involved in identifying such potential channels by the process of proactive scanning.

Cognitive radios strive to maintain the best wireless link with the peer device or base station so as to provide the best end user experience. When the application data stream requires limited bandwidth but for extended periods of time, then the traditional approach of "scanning when idle" does not work.

What's proposed in this disclosure is a novel approach to minimize the amount of time required to identify potential channels and also a scheduling algorithm that will maximize the opportunities for a mobile device to scan for potential channels while continuing to receive send and receive data on the current channel efficiently.

In reference to prior art disclosure US 2011/0116358 A9 this disclosure is novel because Applicant's disclosure is mainly focused on assigning bandwidth around the position of the beacon frame, which is again staggered across channels, while in the above referenced document the beacon is inserted randomly as strip symbols according to certain criteria based upon a characteristic of the cell, or drift, or some means for identifying the subband position for the beacon signal. Applicant's solution is different because the TDD system described has the beacon at known positions staggered across channels purely to facilitate scanning other channels for handoff to. Applicant also primarily describes a scheduling algorithm by the base station that increases the opportunities for the mobile device to scan for other channels.

BRIEF SUMMARY OF THE INVENTION

A cognitive radio transmission method is disclosed that enables cognitive radios to rapidly scan for neighboring channels by staggering the position of beacons across the frame relative to other channels and intelligently allocate the bandwidth across super frames such that a device has the ability to switch and scan multiple beacons both within and across multiple super frames.

DESCRIPTION OF THE DRAWINGS

For a fuller understanding of the nature and objects of the invention, reference should be made to the accompanying drawings, in which.

DETAILED DESCRIPTION OF THE INVENTION

Figure 1:
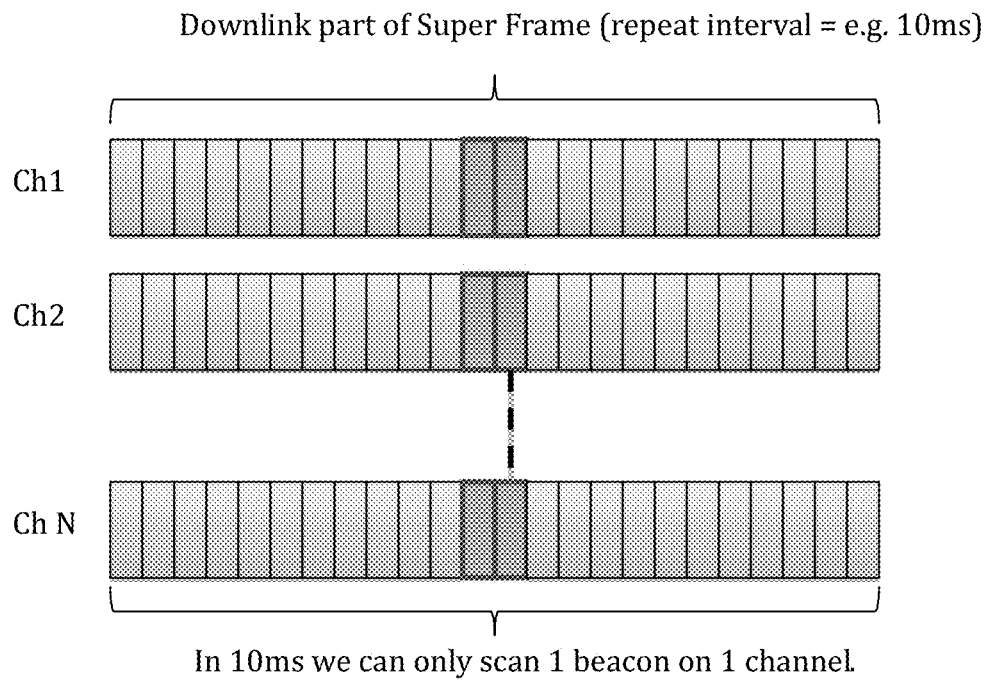
FIG. 1 is a diagram showing beacons in traditional TDMA based systems.
Figure 1:

In wireless wide area cellular (and cellular like) systems, mobility of devices across cells served by different base stations is a major characteristic of the network. xMax networks are comprised of mobile devices that register with Access Points which provide access to the Internet via a mobile switching center (xMSC). Network planners deploy cells with overlap zones that are designed to ensure smooth handoffs across cells. Mobile devices are capable of moving quite fast (a typical design limit is 70 mph) and hence can move from one cell to another within an extremely short span of time. In this case, one defines the handoff as 'inter-Access-Point handoff' (or Inter-AP handoff). In order to have a successful handoff one needs to identify a potential channel. This process can be reactive or proactive. In either case greater latency in identifying a channel implies that the mobile device continues to stay on a rapidly deteriorating link with its existing AP. After a certain point, the user experience will suffer.

Scanning involves searching for a known pattern or burst on a new channel. In many wireless systems a "Beacon" is used for this purpose. This Beacon can take multiple shapes and forms. It may be a known sequence within a channel or a dedicated channel among others. For the purpose of this invention we restrict the description to a special data frame within a channel.

In xMax networks the Beacon is sent at regular intervals. The beacon frame contains preamble sequences that are known a' priori and also contain a payload with network information. When mobile devices power up or wish to switch channels, they scan for beacons on a new channel. This process involves searching for the preamble sequence in the new channel. If the receiver can successfully detect the sequence, then an attempt to decode the subsequent payload is made by some means like a cyclic redundancy Check (CRC) or Checksum. If successful, then a beacon has been successfully found in the new channel. To minimize the chances of a false detection, both at the preamble stage and decoding stages, this process is usually repeated a few times.

In most wireless systems the subscriber devices power up randomly (or wake up from sleep) and join or re-associate with the network by scanning the channel for a beacon or some similar control information. At the beginning the beacon position is unknown, but once synchronized most systems rely on the beacon being present at a pre-determined position.

A beacon is broadcast to all users and required to be sent at regular intervals to allow for devices to join and re-join the network. The beacon interval has a direct impact on system performance. A shorter repeat interval ensures that devices can power up and obtain sync, timing, and register faster. For current users that are active in some data session, the beacon is also important for periodic re-syncing, scanning for other channels etc. However, if the repeat interval is short, the system overhead is high and results in lower throughput because a greater portion of the bandwidth has been utilized for control information. On the contrary, a longer beacon interval helps increase system throughput because there is more bandwidth available to send user data but adds to the delay in joining or searching for other channels. Users that power up are more tolerant and can accept a longer delay in searching for a network connection. Active users on the other hand, particularly those that are mobile, require that their current session be maintained, because a dropped call/session is much more detrimental. Therefore striking a balance is vital to improving overall system throughput.

In networks that employ CSMA as the MAC layer access technique, the beacon is repeated at regular intervals, however, the position can vary due to contention on the channel. In TDMA based systems, the beacon interval is usually fixed and present at the same position within the frame.

From the above discussion, it is clear that the scanning latency is directly proportional to the beacon position and interval. Additionally, since one cannot get accurate estimates of channel quality using metrics like RSSI/SNR based on a single instantaneous value, one requires repeated scans of the same channel to collect a history of this information. If the beacon scheme depicted in FIG. 1 is employed the total duration to complete one complete scan of all channels is directly proportional to the number of channels and the repeat interval. This can be quite prohibitive in systems with large channels or large intervals.

The total latency can be computed using the formula:

$$\text{Total Latency } T_1 = (N_c * \tau * n)/N_b$$

Where
$N_c$=Number of Channels
$N_b$=Number of beacons per super frame
$\tau$=duration of super frame in ms
n=number of iterations to repeat
Using some example values one can calculate the latency for a system that has, if there are 20 channels, a frame duration of 10 ms and the beacon repeats every 10 ms
$N_c$=20
$N_b$=1
$\tau$=20 ms
n=5
Total Latency $T_1$=(20*20*5)/1
Total Latency $T_1$=2 seconds
Add the effects of fading and high speeds and one can see that it can become quite prohibitive.

The problem can be overcome by reducing $N_c$, $\tau$ or n or increasing $N_b$.

Modifying any of these variables has an impact as follows:

Reducing $N_c$: The total number of channels is a high level system parameter but can be modified to minimize latency. Scanning only a subset of the available channels is one way to do this. However, when deploying a wide area network, all channels will not be available at all locations. Therefore, at some point of time, one will have to do a scan of all channels in the system in order to determine what channels are available at that geographical location.

Reducing $\tau$: This is again a system level parameter that has an impact on every user. The super frame duration cannot be arbitrarily changed and has been designed considering several factors like channel coherence, band of operation, channel bandwidth, throughput etc. Therefore, from a scanning perspective, this parameter cannot be modified.

Reducing n: This is probably the most practical and easily modifiable parameter. However this can skew the process of channel selection and result in failed or inefficient handoffs. If only very few samples are available the probability of selecting an incorrect channel is high. For example fast fades can make the instantaneous value of a good channel look bad and make a bad channel look good. Multiple values sampled at different points in time will help alleviate this problem and help select the best channel.

Increasing $N_b$: The definition of $N_b$ has many interpretations in this case. $N_b$ can be the number of beacons slots/symbols present in a frame. It can also be interpreted as the number of beacons a device can scan per frame. In systems represented by FIG. 1 the value is 1 beacon per frame. $N_b$ also translates into the beacon interval. Short interval systems have it at 1 (higher is usually not done) while longer interval systems have a value below 1. So, for example, if the interval is increased, and the beacon is only sent every 40 ms with a 10 ms frame duration, this value becomes ¼ or 0.25. Again there are pros and cons to having a lower value as discussed above.

When the end user application is sending data packets that can be categorized as Constant Bit Rate (CBR) traffic, then the requirement is usually for low total bandwidth, but over an extended period of time. For example with VoIP the total bandwidth for RTP traffic within a frame would be very small, but the bandwidth is required for the entire duration of the call.

In such situations, the radio is usually never idle. Therefore employing a strategy of "Scan when idle" does not work. Also in TDM systems, to minimize control messages, the bandwidth is usually granted forever until the call is terminated. In these cases, the bandwidth is most often assigned at the same relative position within the frame. This reduces the control overhead associated with informing the user about the assigned bandwidth. However this poses a problem as depicted in the FIG. 2.

Figure 2:
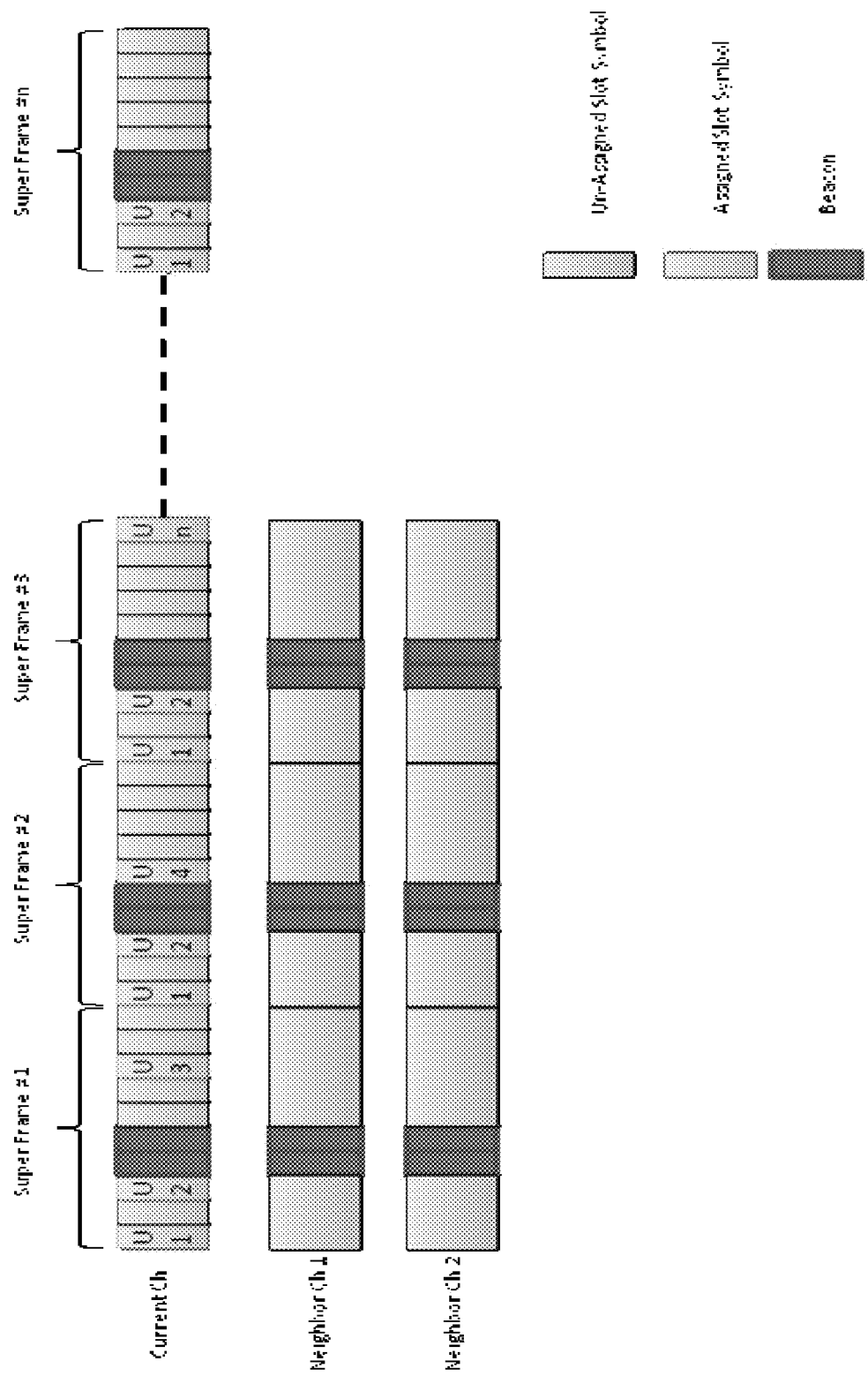
FIG. 2 is a diagram showing assigned bandwidth in relation to beacon position.

FIG. 2 shows an example where different users are assigned bandwidth/timeslots in the frame. Some users, like U1 and U3, are at offsets away from the beacon slot/symbol while U2 on the other hand is most likely in a voice session and is assigned the slot adjacent to the beacon. Since there is always a finite non-negligible amount of time required by the hardware to switch channels it may not be possible to scan for beacons on neighboring channels, particularly if the bandwidth is assigned for a long time. The radio may be forced to make a tradeoff and opt to drop some of the assigned bandwidth data in order to scan for beacons on the neighboring channels. This can result in significant degradation of performance.

What's disclosed below is a novel solution for the above problems which can be applied on most wireless networks to achieve the best optimal balance between throughput and seamless handoff.

This disclosure describes a novel method to solve the problems described above. This solution makes the following reasonable assumptions.

All the Access Points within the network are synchronized in time using GPS with millisecond resolution.

The hardware on the mobile device allows switching channels (including settle PLLs, amplifiers and other RF components) within a very short time, in the order of a symbol duration/timeslot or less.

The basic idea involves two parts. The first is to modify the beacon position across channels and the second is to implement an intelligent scheduling algorithm that assigns bandwidth at random positions within the super-frame. Rather than have the beacons at a fixed position across channels, they will be staggered across the super-frame on different channels. Ideally one would like the beacon to have N unique positions within the super-frame, where N is the total number of channels. This would require a longer super-frame duration if N is quite large. However this is not necessary. The beacon position can be spread apart as much as possible and the same position can be shared on multiple channels.

The intelligent resource allocation algorithm of this disclosure ensures random assignment of the same user across super frames. This will ensure that a user with CBR traffic is placed at different positions relative to the beacon symbol and provides several opportunities to scan beacons on other channels—even those that have the same position as the current channel.

The relative position of the beacon on each channel is pre-determined. This is calculated using a very simple formula. Feasible positions are first determined and once the total number of positions is decided, simple modulo arithmetic on the total number of channels is performed to arrive at the beacon position on a specific channel as follows:

Beacon position on channel x=(x % number of positions).

Figure 3:
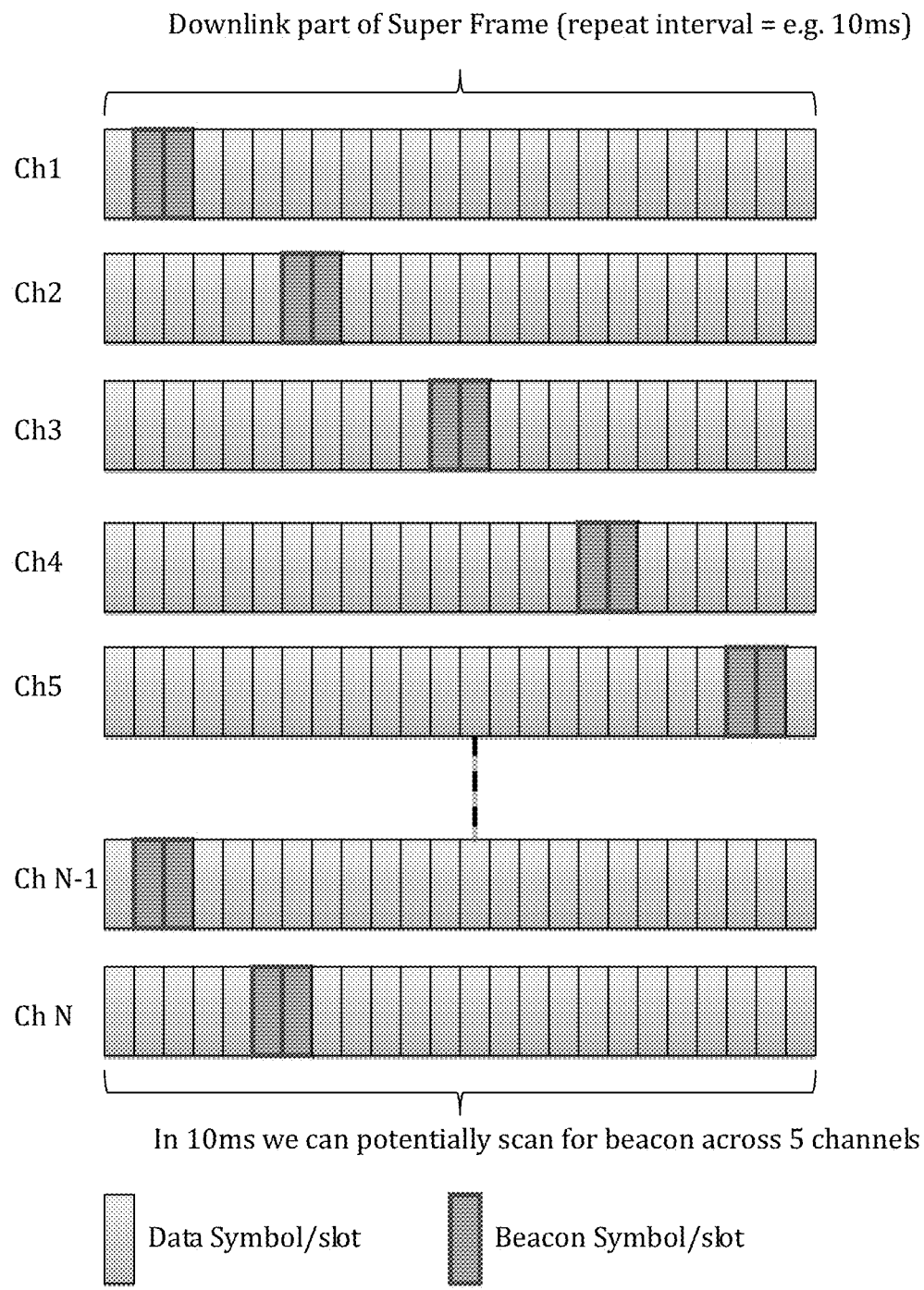
FIG. 3 is a diagram showing staggering beacon positions within the frame across channels; and, FIG. 4 is a diagram showing scanning opportunities with random placement across super frames.

Note: This assumes that the places are represented from 0 to number of (positions −1) and 0>=x<max number of channels For example, if there are 20 channels, and 5 distinct positions as portrayed in FIG. 3 then the beacon position on channel 14 will be 14%5=4

The resource allocation algorithm is done such that no user is assigned the same starting position within the super frame. A pseudo random start position is picked for a given user and the bandwidth is assigned. An obvious drawback of this is that it is possible that only a subset of the requested bandwidth is assigned. For example, if the last slot is picked and the users requests more than one slot, this will assign very little bandwidth. Therefore one does this in two phases, the assignment phase and the placement phase.

During the assignment phase the available bandwidth is first assigned to users as required. Users are selected according to the priority or Class of traffic (QOS) and bandwidth is assigned based on available bandwidth. Once all bandwidth has been assigned, the bandwidth is then placed appropriately within the frame. To ensure every user gets a fair chance to scan beacons on all channels in every super-frame, a random starting point in chosen from the bandwidth allocated list and users are placed in the super-frame sequentially from that index onwards. Placing a user means fixing the starting symbol position for that user in the super-frame. This makes sure users move around in position from one frame to another as in every frame a random index is chosen.

Figure 4:
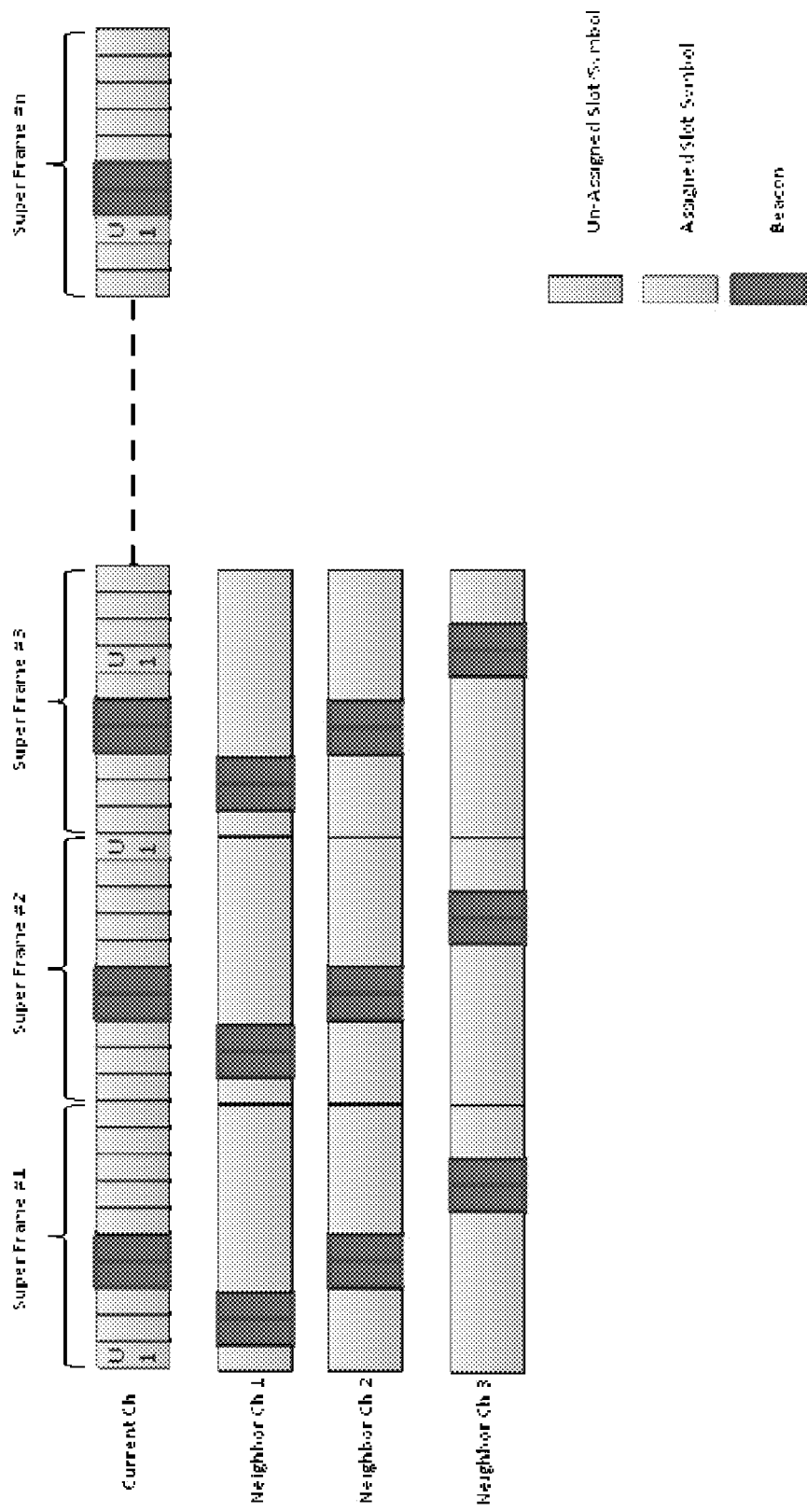

To elaborate, as shown in FIG. 4, user 1 is assigned slots that are different positions in each super frame. Therefore in super frame 1 user 1 has the opportunity to scan beacons on channels 2 and 3. In super frame 2, user 1 is able to scan the current channel and channel 1 while in super frame 3 user 1 can scan channel 1 again and channel 2. Therefore it is quite clear that, unlike in FIG. 2 where user 2 can hardly scan any beacon, this solution significantly improves the scan intervals and maintenance of an updated list of neighbor channels.

One can now compute the scanning latency using the same formula used before. The method proposed above gives a different dimension to computing $N_b$. Rather than conventional wisdom, which when employed would focus on reducing values in the equation, this novel approach focuses on increasing $N_b$ and effectively reducing the total time required for a complete scan of N channels. In order to do so one focuses on the second interpretation of $N_b$ that is the number of beacons that can be scanned per frame. By increasing this value, the effective time is drastically reduced. For example, to compute the total latency in this case for the use case described earlier, the equation is modified as:

Nc=20

$N_b$=5

τ=20 ms n=5

Total Latency $T_1$=(20*20*5)/5

Total Latency $T_1$=400 milliseconds

Therefore it is very evident that keeping everything else identical, simply altering the relative position of the beacon within the frame across channel one sees almost an 80% reduction in the latency to scan and obtain the same amount of information.

The use case described above is the best case scenario for an idle device. The maximum gain is obtained when compared to an idle device operating in a traditional TDMA system as described in FIG. 1. With active users it may not be possible to scan multiple beacons within a frame because there may be traffic data present on the current channel. This traffic may very well coincide with the beacon slot on another channel. However, one can assume that in a worst case the device will scan at least one beacon per frame, or, if the interval is larger, it will match other systems. Therefore, in an active user scenario, the worst-case performance with the proposed approach will be the same as that of an idle user on the traditional system. This is a significant improvement in overall system performance with minimum impact to other parameters.

A technique whereby cognitive radios can rapidly scan for neighboring channels is described in this disclosure. The idea proposes to stagger the position of beacons across the frame relative to other channels and to intelligently allocate the bandwidth across super frames so that a device has the ability to switch and scan multiple beacons both within and across multiple super-frames. This will allow the mobile device to rapidly scan a large number of channels in short order, or, within a particular time window, scan a few channels multiple times to obtain a good representation of that channel.

Since certain changes may be made in the above described method to allow rapid scanning by cognitive radios without departing from the scope of the invention herein involved, it is intended that all matter contained in the description thereof shall be interpreted as illustrative and not in a limiting sense.

What is claimed is:

1. A cognitive radio transmission method that enables multi-channel cognitive radios being operated by users who require a varying number of timeslots depending on channel bandwidth requirements of each of said users to rapidly scan channels in a multi-channel network containing access points wherein each channel has a beacon located in a timeslot contained in a superframe containing multiple timeslots comprising:

synchronizing in time each of said access points;
switching, by said multi-channel cognitive radios, said channels in less time than a duration of said timeslot contained in said superframe in said multi-channel network;
staggering each said beacon across each said superframe in relation to each of said channels;
then adjusting channel bandwidth for each of said users by first allocating to each of said users said varying number of timeslots according to said channel bandwidth requirements of each of said users on a list of each of said users;
then choosing a random starting point on said user channel bandwidth allocated list;
then placing each of said users in said allocated number of timeslots sequentially from said chosen random starting point forward through said multiple timeslots in said superframe; and,
repeating said choosing and placing for each said superframe in each of said channels.

* * * * *